US009904079B2

United States Patent
Wang (10) Patent No.: US 9,904,079 B2
(45) Date of Patent: Feb. 27, 2018

(54) ALIGNMENT APPARATUS AND ALIGNMENT METHOD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Zhouping Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 120 days.

(21) Appl. No.: 14/893,761

(22) PCT Filed: Jun. 5, 2015

(86) PCT No.: PCT/CN2015/080828
§ 371 (c)(1),
(2) Date: Nov. 24, 2015

(87) PCT Pub. No.: WO2016/107080
PCT Pub. Date: Jul. 7, 2016

(65) Prior Publication Data
US 2016/0341984 A1    Nov. 24, 2016

(30) Foreign Application Priority Data
Dec. 30, 2014    (CN) .......................... 2014 1 0844035

(51) Int. Cl.
G01B 11/26    (2006.01)
G02F 1/13    (2006.01)
(Continued)

(52) U.S. Cl.
CPC ............ *G02F 1/1303* (2013.01); *G01B 11/27* (2013.01); *G02B 5/30* (2013.01); *G02B 7/003* (2013.01); *G02F 1/133528* (2013.01)

(58) Field of Classification Search
CPC . G02F 1/1303; G02F 1/133528; G01B 11/27; G01B 5/30; G01B 7/003
(Continued)

(56) References Cited

U.S. PATENT DOCUMENTS

2004/0012851 A1    1/2004    Sato et al.
2006/0274310 A1*   12/2006   Kandel ................ G01N 21/211
                                                            356/369

(Continued)

FOREIGN PATENT DOCUMENTS

CN    101718924 A    6/2010
CN    102393568 A    3/2012
(Continued)

OTHER PUBLICATIONS

International Search Report & Written Opinion Appln. No. PCT/CN2015/080828; dated Sep. 14, 2015.
(Continued)

*Primary Examiner* — Hina F Ayub
(74) *Attorney, Agent, or Firm* — Ladas & Parry LLP; Loren K. Thompson (57) ABSTRACT

An alignment apparatus and an alignment method are provided. The alignment apparatus is configured to align a polarizer. The alignment apparatus comprises an angle adjustment device. The angle adjustment device is configured to: adjust an angle of the polarizer to be aligned according to an angle offset of the polarizer to be aligned in a plane where the polarizer to be aligned is located. The alignment apparatus and the alignment method reduce difficulty in alignment of non-rectangular polarizer.

16 Claims, 6 Drawing Sheets

(51) Int. Cl.
*G01B 11/27* (2006.01)
*G02B 5/30* (2006.01)
*G02B 7/00* (2006.01)
*G02F 1/1335* (2006.01)

(58) Field of Classification Search
USPC .......................................................... 356/138
See application file for complete search history.

(56) References Cited

U.S. PATENT DOCUMENTS

| | | | |
|---|---|---|---|
| 2010/0085514 | A1 | 4/2010 | Tsuchiya et al. |
| 2012/0267541 | A1* | 10/2012 | Utukuri .................... G01D 5/34 |
| | | | 250/394 |
| 2014/0111849 | A1* | 4/2014 | Xuegong ............... G02B 7/003 |
| | | | 359/352 |
| 2015/0109597 | A1* | 4/2015 | Schmitt ................ G02B 5/3025 |
| | | | 355/71 |

FOREIGN PATENT DOCUMENTS

| | | |
|---|---|---|
| CN | 103149727 A | 6/2013 |
| CN | 103697836 A | 4/2014 |
| CN | 104460069 A | 3/2015 |
| CN | 204462577 U | 7/2015 |
| JP | 2000-221461 A | 8/2000 |
| JP | 3796995 B2 | 7/2006 |
| WO | 02/099510 A1 | 12/2002 |

OTHER PUBLICATIONS

First Chinese Office Action dated Nov. 21, 2016; Appln. No. 201410844035.3.

* cited by examiner

| adjusting an angle of a polarizer to be aligned according to an angle offset of the polarizer to be aligned in a plane where the polarizer to be aligned is located | ~101 |

ALIGNMENT APPARATUS AND ALIGNMENT METHOD

TECHNICAL FIELD

Embodiments of the present disclosure relate to an alignment apparatus and an alignment method.

BACKGROUND

In a Thin Film Transistor-Liquid Crystal Display (TFT-LCD), deflection state of liquid crystal molecules is controlled by using an electric field, so that the light form the backlight is controlled to transmit the liquid crystal molecules and then transmit color filters of a color filter layer to display color image. So, it is required that a polarizer should be aligned during attaching the polarizer in a fabrication process of the TFT-LCD.

With respect to the polarizer of rectangular shape, attachment and alignment thereof is relatively easily achieved by an automatic attachment process. With respect to the polarizer of circular shape, regular polygonal shape and the like, attachment and alignment thereof is achieved by hand, which has lower accuracy in alignment and is a waste of manpower and time. Or, an alternative process is employed: the polarizer of circular shape, regular polygonal shape and the like is firstly fabricated in a square polarizer, and then the portion of the square polarizer than the polarizer of circular shape, regular polygonal shape and the like is removed after the square polarizer is attached and aligned by the automatically attachment process. Apparently, the alternative process is difficult to implement, is complex to operate, and even may damage the substrate.

SUMMARY

According to embodiments of the disclosure, there is provided an alignment apparatus. The alignment apparatus is configured to align a polarizer. The alignment apparatus comprises an angle adjustment device; and the angle adjustment device is configured to: adjust an angle of the polarizer to be aligned according to an angle offset of the polarizer to be aligned in a plane where the polarizer to be aligned is located.

For example, the angle adjustment device includes an angle acquirement unit and an angle compensation unit; the angle acquirement unit is configured to: acquire the angle offset; and the angle compensation unit is configured to: rotate the polarizer to be aligned with respect to a predetermined rotation axis according to the angle offset, so as to reduce or eliminate the angle offset.

For example, the angle acquirement unit includes: an analyzer, a light intensity detection means and an angle offset determination means; the analyzer includes an analyzing polarizer. The light intensity detection means is configured to: detect intensity of light which transmits both the polarizer to be aligned and the analyzing polarizer; and the angle offset determination means is configured to: determine the angle offset of the polarizer to be aligned according to the light intensity detected by the light intensity detection means.

For example, the angle offset determination means determines the angle offset of the polarizer to be aligned according to a pre-stored look-up table between the light intensity and the angle offset.

For example, the angle offset determination means is configured to: determine an included angle between an optical axis direction of the analyzing polarizer and an optical axis direction of the polarizer to be aligned according to the light intensity detected by the light intensity detection means, and determine the angle offset of the polarizer to be aligned according to a pre-stored look-up table between the included angle and the angle offset.

For example, the optical axis direction of the polarizer to be aligned is an absorption axis direction of the polarizer to be aligned, and the optical axis direction of the analyzing polarizer is an absorption axis direction of the analyzing polarizer; or, the optical axis direction of the polarizer to be aligned is a transmission axis direction of the polarizer to be aligned, and the optical axis direction of the analyzing polarizer is a transmission axis direction of the analyzing polarizer.

For example, the angle acquirement unit further includes a first rotation means, and the first rotation means is configured to: rotate the analyzing polarizer; and the angle offset determination means is configured to: determine the angle offset of the polarizer to be aligned according to the included angle between the optical axis direction of the analyzing polarizer and the optical axis direction of the polarizer to be aligned in the case that the detected light intensity has a peak in a process of rotating the analyzing polarizer by the first rotation means.

For example, the predetermined rotation axis is a central point of the polarizer to be aligned.

For example, the alignment apparatus further comprises a position adjustment device; and the position adjustment device is configured to: adjust a position of the polarizer to be aligned in X and Y directions perpendicular to each other within the plane where the polarizer to be aligned is located.

For example, the position adjustment device is configured to: by using an alignment mark on the polarizer to be aligned, adjust the position of the polarizer to be aligned in X and Y directions perpendicular to each other within the plane where the polarizer to be aligned is located.

According to the embodiments of the disclosure, there is provided an alignment method. The alignment method is employed to align a polarizer. The method comprises: adjusting an angle of the polarizer to be aligned according to an angle offset of the polarizer to be aligned in a plane where the polarizer to be aligned is located.

For example, the adjusting the angle of the polarizer to be aligned according to the angle offset of the polarizer to be aligned in the plane where the polarizer to be aligned is located includes: acquiring the angle offset; and rotating the polarizer to be aligned with respect to a predetermined rotation axis according to the angle offset, so as to reduce or eliminate the angle offset.

For example, the acquiring the angle offset includes: detecting intensity of light which transmits both the polarizer to be aligned and a analyzing polarizer; and determining the angle offset of the polarizer to be aligned according to the detected light intensity.

For example, the determining the angle offset of the polarizer to be aligned according to the detected light intensity includes: determining the angle offset of the polarizer to be aligned according to a pre-stored look-up table between the light intensity and the angle offset.

For example, the determining the angle offset of the polarizer to be aligned according to the detected light intensity includes: determining an included angle between an optical axis direction of the analyzing polarizer and an optical axis direction of the polarizer to be aligned according to the detected light intensity; and determining the angle offset of the polarizer to be aligned according to a pre-stored look-up table between the included angle between the optical axis direction of the analyzing polarizer and the optical axis direction of the polarizer to be aligned and the angle offset.

For example, the optical axis direction of the polarizer to be aligned is an absorption axis direction of the polarizer to be aligned, and the optical axis direction of the analyzing polarizer is an absorption axis direction of the analyzing polarizer; or, the optical axis direction of the polarizer to be aligned is a transmission axis direction of the polarizer to be aligned, and the optical axis direction of the analyzing polarizer is a transmission axis direction of the analyzing polarizer.

For example, the method further comprises: rotating the analyzing polarizer; and determining the angle offset of the polarizer to be aligned according to the included angle between the optical axis direction of the analyzing polarizer and the optical axis direction of the polarizer to be aligned in the case that the detected light intensity has a peak in a process of rotating the analyzing polarizer.

For example, the predetermined rotation axis is a central point of the polarizer to be aligned.

For example, the method further comprises: adjusting a position of the polarizer to be aligned in X and Y directions perpendicular to each other within the plane where the polarizer to be aligned is located.

For example, the adjusting the position of the polarizer to be aligned in X and Y directions perpendicular to each other within the plane where the polarizer to be aligned is located includes: by using an alignment mark on the polarizer to be aligned, adjusting the position of the polarizer to be aligned in X and Y directions perpendicular to each other within the plane where the polarizer to be aligned is located.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments of the disclosure, those ordinarily skilled in the art can obtain other embodiment(s), without any inventive work, which should be within the protective scope of the disclosure.

Figure 1:
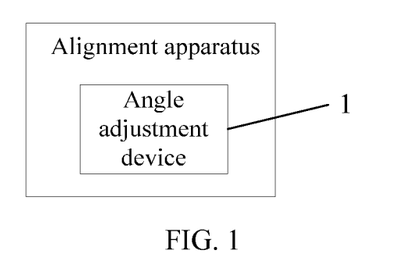
FIG. 1 is a structural schematic view illustrating an alignment apparatus according to embodiments of the disclosure.

Embodiments of the disclosure provide an alignment apparatus, and the alignment apparatus is configured to align a polarizer. Referring to FIG. 1, the alignment apparatus comprises: an angle adjustment device 1. The angle adjustment device 1 is configured for adjusting an angle of a polarizer to be aligned according to an angle offset of the polarizer to be aligned in a plane where the polarizer to be aligned is located.

A position offset or a distance offset represents a position deviation between the polarizer to be aligned and its expected position. The angle offset represents an angle deviation between the polarizer to be aligned and its expected angle. More specifically, the position offset refers to the position deviation between a position of any point or a predetermined point in the polarizer to be aligned in x-y coordinate system (in which x direction and y direction are perpendicular to each other) and its expected position; the angle offset refers to the angle deviation generated by rotating the polarizer to be aligned around any point or a predetermined point (such rotation is caused by error operation or any other operations), so that an actual optical axis direction of the polarizer to be aligned is not in line with an expected optical axis direction.

In a process of aligning the polarizer, for example, it can be determined whether there is the angle offset before or after the physical position is aligned with reference to any point or a predetermined point in the polarizer to be aligned; if there is the angle offset, the angle should be adjusted with respect to the determined angle offset by rotating with the any point or the predetermined point as an axis, to make the angle offset be zero, that is, to achieve accurate alignment in position and angle. If there is no angle offset, no angle compensation operation will be taken.

It should be noted that, the embodiments of the disclose only describes alignment and angle adjustment in the plane where the polarizer is located, but is not limited to only carrying out alignment and angle adjustment in the plane where the polarizer is located. Of course, the alignment apparatus and the alignment method according to the embodiments of the disclosure are also applicable to alignment and angle adjustment in the other planes.

In the embodiments of the disclosure, a specific configuration for the angle adjustment device is not particularly defined as long as the configuration can achieve the angle adjustment function.

For the alignment apparatus provided in the embodiments of the disclosure, the alignment apparatus is applied to the alignment process of the polarizer and comprises the angle adjustment device, and the angle adjustment device is configured to adjust the angle of the polarizer to be aligned according to the angle offset of the polarizer to be aligned in the plane where the polarizer to be aligned is located. Thus, no matter what shape the polarizer has, the alignment between an absorption axis or a transmission axis of the polarizer and a reference position side in a display device can be achieved according to the angle offset of the polarizer, which solves the problem of difficult alignment for non-rectangular polarizer in current alignment process, reduces difficulty in alignment of the non-rectangular polarizer, improves accuracy in alignment of the polarizer, and ensures display performance of the display device.

Figure 2:
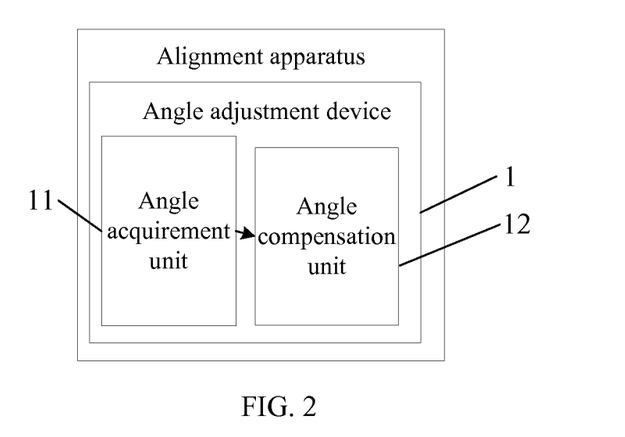
FIG. 2 is a structural schematic view illustrating another alignment apparatus according to the embodiments of the disclosure.

For example, referring to FIG. 2, the angle adjustment device 1 includes: an angle acquirement unit 11 and an angle compensation unit 12.

The angle acquirement unit 11 is configured to acquire the angle offset.

There are a variety of ways to acquire the angle offset. For example, the angle offset is acquired by acquiring an included angle between the optical axis direction of the polarizer to be aligned and a predetermined reference direction. The predetermined reference direction may be a direction of the reference position side in the display substrate, or may directly be a direction where an optical axis of an analyzing polarizer described below is located, or may be a direction of a straight line arranged in any positions.

The angle compensation unit 12 is configured to rotate the polarizer to be aligned with respect to a predetermined rotation axis according to the angle offset, so as to reduce or eliminate the angle offset. Preferably, a rotation amount (i.e., a compensation amount) exactly offsets the angle offset, to achieve an optimal effect of adjusting the angle offset.

For example, the predetermined rotation axis is a central point of the polarizer to be aligned.

An output terminal of the angle acquirement unit 11 is connected with an input terminal of the angle compensation unit 12.

Figure 3:
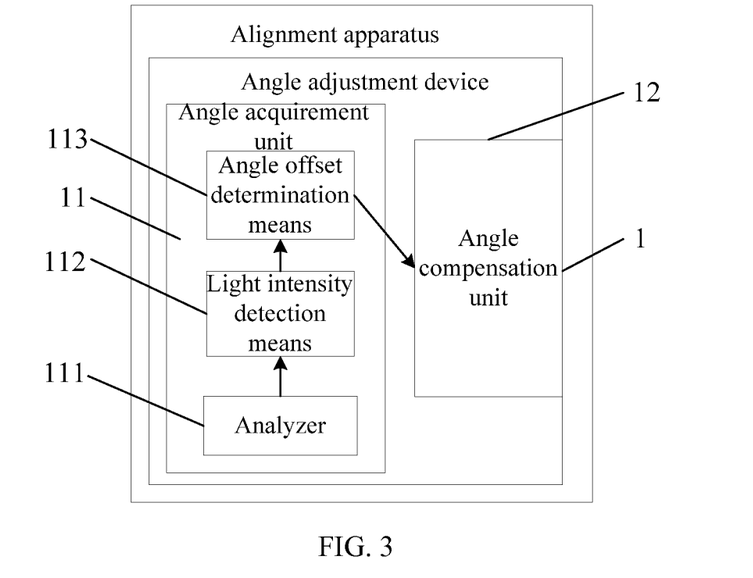
FIG. 3 is a structural schematic view illustrating yet another alignment apparatus according to the embodiments of the disclosure.

For example, referring to FIG. 3, the angle acquirement unit 11 includes: an analyzer 111, a light intensity detection means 112 and an angle offset determination means 113.

An output terminal of the analyzer 111 is connected with an input terminal of the light intensity detection means 112.

An output terminal of the light intensity detection means 112 is connected with an input terminal of the angle offset determination means 113.

For example, the analyzer 111 includes an analyzing polarizer.

The light intensity detection means 112 is configured to detect intensity of light which transmits both the polarizer to be aligned and the analyzing polarizer.

The angle offset determination means 113 is configured to determine the angle offset of the polarizer to be aligned according to the light intensity detected by the light intensity detection means 112.

For example, the analyzer may be arranged above or below the polarizer to be aligned; or, the analyzer may be arranged on right or left side of the polarizer to be aligned. It should be noted that, the position of the analyzer is merely exemplified in the embodiments, but is not limited to these positions. In actual design, any position is applicable as long as it can realize the function of the analyzer.

For example, the light intensity detection means detects intensity of the light deflected by the polarizer to be aligned and the analyzer, and sends the obtained intensity of the deflected light to the angle offset determination means, and then the angle offset determination means determines the angle offset between the optical axis direction of the polarizer to be aligned and a predetermined reference direction according to the light intensity.

Figure 4:
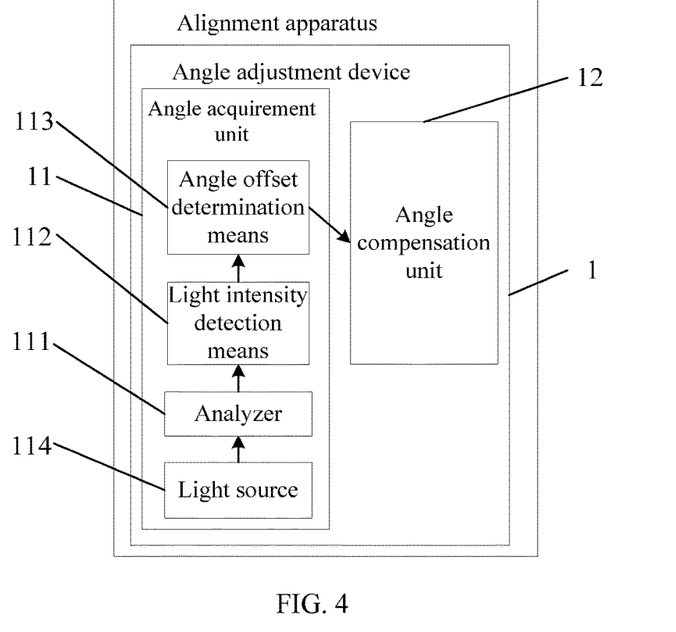
FIG. 4 is a structural schematic view illustrating still another alignment apparatus according to the embodiments of the disclosure.

For example, referring to FIG. 4, the angle acquirement unit 11 further includes: a light source 114. The light source 114 is configured for emitting light to the polarizer to be aligned. For example, the polarizer to be aligned is located between the light source 114 and the analyzer 111.

The light source 114 for example is a natural light source, a circularly polarized light source, an elliptically polarized light source, a partially polarized light source or a linearly polarized light source. It should be noted that, if the light source is the linearly polarized light source, a technical solution may be realized and a required technical effect may be achieved by rotating the linearly polarized light source repeatedly; of course, if the linearly polarized light source is not rotated, the corresponding technical effect may also be achieved through look-up table between light intensities and optical axes. Of course, the circularly polarized light source is preferably used in the embodiments; in this case, it is not necessary to rotate the light source, so it is simple, and accuracy of the obtained results is higher.

Exemplarily, the light source is arranged below or above the polarizer to be aligned, and the analyzer is arranged above or below the polarizer to be aligned; or, the light source is arranged on left or right side of the polarizer to be aligned, and the analyzer is arranged on the right or left sides of the polarizer to be aligned. It should be noted that, the positions of the light source and the analyzer are merely exemplified in the embodiments, but are not limited to these positions. In actual design, any position is applicable as long as it can realize the function of the analyzer and the function of the light source.

For example, the angle offset determination means 113 determines the angle offset of the polarizer to be aligned according to pre-stored look-up table between the light intensity and the angle offset.

For example, the angle offset determination means 113 is configured to: determining an included angle between the optical axis direction of the analyzing polarizer and the optical axis direction of the polarizer to be aligned according to the light intensity detected by the light intensity detection means 112, and determining the angle offset of the polarizer to be aligned according to the pre-stored look-up table between the included angle and the angle offset.

For example, the optical axis direction of the polarizer to be aligned is the absorption axis direction of the polarizer to be aligned, and the optical axis direction of the analyzing polarizer is the absorption axis direction of the analyzing polarizer; or, the optical axis direction of the polarizer to be aligned is the transmission axis direction of the polarizer to be aligned, and the optical axis direction of the analyzing polarizer is the transmission axis direction of the analyzing polarizer.

For example, the included angle between the optical axis direction of the polarizer to be aligned and the optical axis direction of the analyzing polarizer is the angle offset of the polarizer to be aligned; the larger the included angle between the optical axis direction of the polarizer to be aligned and the optical axis direction of the analyzing polarizer is, the larger the angle offset of the polarizer to be aligned is; and the smaller the included angle between the optical axis direction of the polarizer to be aligned and the optical axis direction of the analyzing polarizer is, the smaller the angle offset of the polarizer to be aligned is. For example, after the included angle between the optical axis direction of the polarizer to be aligned and the optical axis direction of the analyzing polarizer is determined, the polarizer to be aligned is moved to make the included angle between the optical axis direction of the polarizer to be aligned and the optical axis direction of the analyzing polarizer be zero, so as to achieve accurate alignment for the polarizer to be aligned.

Setting modes of the optical axis direction as described above are more efficient and convenient to acquire the angle offset, and accuracy of the acquired value is higher. Of course, it is not limited to the above-described modes. For example, in the case that the absorption axis direction of the polarizer to be aligned is used as its optical axis direction, and the transmission axis direction of the analyzing polarizer is used as its optical axis direction, the expected technical effect can be also achieved, as long as a factor that the absorption axis direction and the transmission axis direction are perpendicular to each other is considered.

Figure 5:
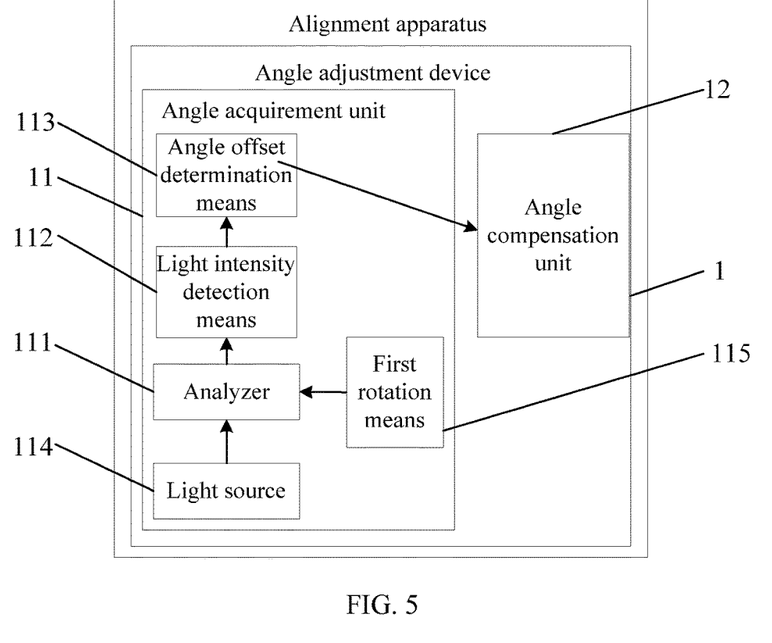
FIG. 5 is a structural schematic view illustrating a further alignment apparatus according to the embodiments of the disclosure.

For example, referring to FIG. 5, the angle acquirement unit 11 further includes: a first rotation means 115.

The first rotation means 115 is configured to rotate the analyzing polarizer. Of course, the first rotation means 115 may be configured to rotate the polarizer to be aligned.

The angle offset determination means 113 is configured to: determine the angle offset of the polarizer to be aligned according to the included angle between the optical axis direction of the analyzing polarizer and the optical axis direction of the polarizer to be aligned in the case that the detected light intensity has a peak in a process of rotating the analyzing polarizer by the first rotation means 115. In this way, it is not necessary to use the look-up table between the light intensity and the angle offset or the look-up table between the included angle and the angle offset; it is only needed to wait until the peak appears, so that the included angle between the optical axis direction of the analyzing polarizer and the optical axis direction of the polarizer to be aligned is directly determined (in the case that both the optical axis direction of the analyzing polarizer and the optical axis direction of the polarizer to be aligned are the absorption axes or the transmission axes, the included angle between the two axes upon the peek appears is zero; in the case one of the optical axis direction of the analyzing polarizer and the optical axis direction of the polarizer to be aligned uses the absorption axis and the other thereof uses the transmission axis, the included angle between the two axes upon the peek appears is 90 degrees), and then the angle offset is determined directly and easily according to the included angle; the solution is more simple in implementation.

For example, in the case that the polarizer to be aligned is rotated and the peak of the light intensity is detected, the included angle between the optical axis direction of the polarizer to be aligned and the optical axis of the analyzing polarizer is zero, so the angle offset of the polarizer to be aligned is zero; and in this case, an angle for compensating the polarizer to be aligned is zero, that is, no compensation is needed.

The first rotation means 115 for example includes: a mechanical clamping arm, a rotation table, a switch and other components.

For example, the first rotation means is configured to determine whether the polarizer to be aligned is rotated according to the received information and the pre-stored information, so that a final position of the polarizer is in the expected position.

Figure 6:
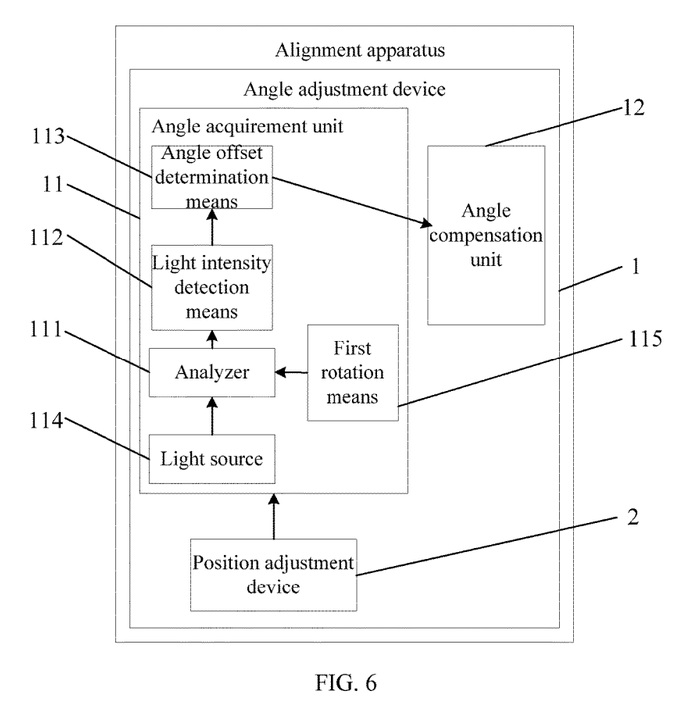
FIG. 6 is a structural schematic view illustrating still a further alignment apparatus according to the embodiments of the disclosure.

For example, referring to FIG. 6, the alignment apparatus further comprises: a position adjustment device 2.

The position adjustment device 2 is configured to: adjust the position of the polarizer to be aligned in X and Y directions perpendicular to each other within the plane where the polarizer to be aligned is located.

For example, the position adjustment device 2 is configured to: by using an alignment mark on the polarizer to be aligned, adjust the position of the polarizer to be aligned in X and Y directions perpendicular to each other within the plane where the polarizer to be aligned is located.

The position adjustment device for example adjusts the position of the polarizer to be aligned before the angle adjustment device adjusts the angle of the polarizer to be aligned. Of course, the position adjustment device may adjust the position of the polarizer to be aligned after the angle adjustment device adjusts the angle of the polarizer to be aligned. A connection relationship between the position adjustment device and the angle adjustment device is exemplarily illustrated in FIG. 6, but is not limited thereto; the arrangement sequence of the position adjustment device and the angle adjustment device can be determined according to actual requirements.

For example, the position of the polarizer to be aligned is adjusted before adjusting the angle of the polarizer to be aligned. In order to adjust the position of the polarizer to be aligned, it is firstly judged whether coordinates of the position of the polarizer to be aligned corresponds to the coordinates of its expected position on the display substrate; if the position of the polarizer to be aligned does not correspond to its expected position on the display substrate, the position of the polarizer to be aligned should be adjusted; if the position of the polarizer to be aligned corresponds to its expected position on the display substrate, no operation is needed. The angle of the polarizer to be aligned is adjusted after the position is adjusted, which can greatly improve efficiency and accuracy in alignment.

Figure 7:
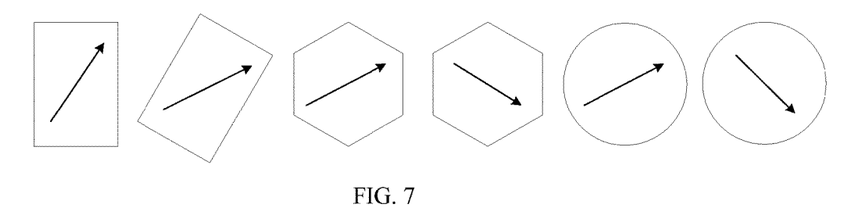
FIG. 7 is a structural schematic view illustrating a polarizer according to the embodiments of the disclosure.
Figure 8:
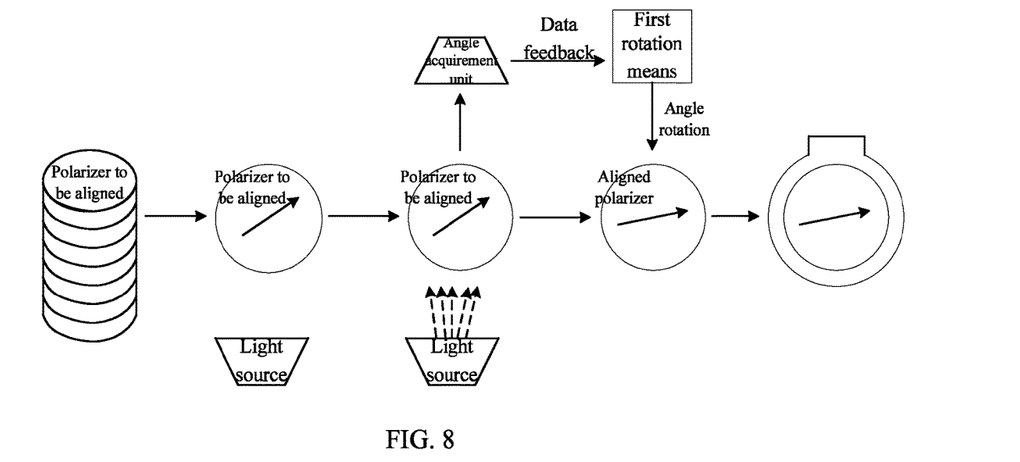
FIG. 8 is a schematic view illustrating a process of aligning a polarizer according to the embodiments of the disclosure.

As shown in FIG. 7, if the polarizer to be aligned is of rectangular shape, the polarizer may be aligned by using the alignment method provided in the prior art, and it is easy to distinguish inaccurate alignment and then to perform accurate alignment. However, if the polarizer to be aligned is of regular polygonal or circular shape, referring to FIG. 7, it is impossible to know there is error in alignment by using the alignment method provided in the prior art, so accuracy alignment of the polarizer in the display device is poor, affecting performance of the display device. In the alignment method according to the embodiments of the disclosure, accuracy alignment of the polarizer can be guaranteed. Referring to FIG. 8, the polarizer to be aligned is of circular shape is described as an example: the polarizer to be aligned is fabricated at first; after the polarizer to be aligned is irradiated by the light source, information is sent to the angle acquirement unit; the angle acquirement unit determines whether the polarizer to be aligned needs to be rotated, and then data information is sent to the first rotation means; the first rotation means rotates the polarizer according to the received data information, so that the polarizer to be aligned is accurately aligned and then is attached to the display device, and the alignment process of the polarizer to be aligned is completed. In FIG. 8, an arrow direction is a direction of the absorption axis or the transmission axis of the polarizer to be aligned.

The embodiments of the disclosure provide the alignment apparatus, and the alignment apparatus is configured to align the polarizer. The alignment apparatus comprises the angle adjustment device, which is configured to adjust the angle of the polarizer to be aligned according to the angle offset of the polarizer to be aligned in the plane where the polarizer to be aligned is located. In this way, no matter what shape the polarizer has, the alignment between the absorption axis or the transmission axis of the polarizer to be aligned and the reference position side in the display device can be achieved according to the angle offset of the polarizer, which solves the problem of difficult alignment for non-rectangular polarizer in current alignment process, reduces difficulty in alignment of the non-rectangular polarizer, improves accuracy in alignment of the polarizer, and ensures display performance of the display device.

Figure 9:
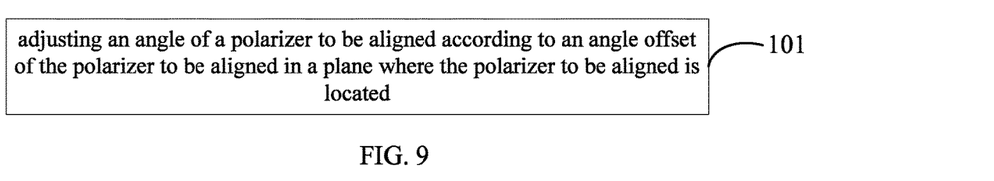
FIG. 9 is a flow schematic view illustrating an alignment method according to the embodiments of the disclosure.

The embodiments of the disclosure provide an alignment method. Referring to FIG. 9, the method comprises the following steps.

101: adjusting an angle of a polarizer to be aligned according to an angle offset of the polarizer to be aligned in a plane where the polarizer to be aligned is located.

For example, the angle offset is different from the position offset or distance offset, and refers to the angle deviation generated by rotating the polarizer to be aligned around any point or a predetermined point in the polarizer to be aligned after the position of the any point or the predetermined point in the polarizer to be aligned is determined in x and y directions perpendicular to each other.

It should be noted that, the details of the above-described steps may referred to the alignment apparatus as described above, which will be not repeated here.

Figure 10:
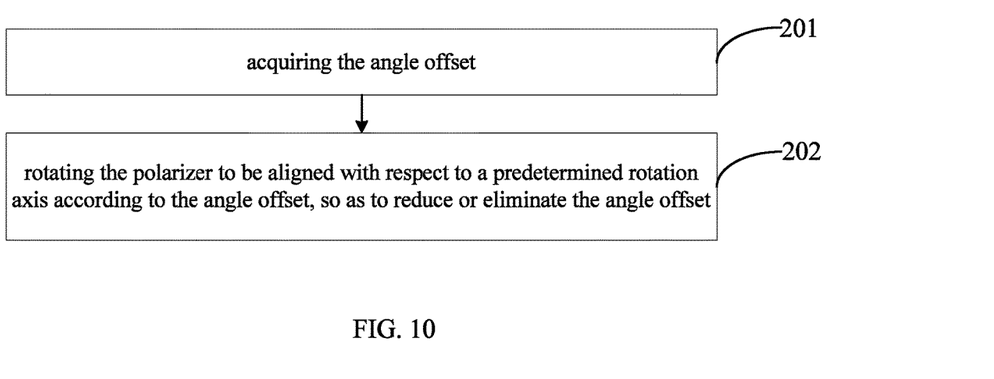
FIG. 10 is a flow schematic view illustrating another alignment method according to the embodiments of the disclosure.

Further, referring to FIG. 10, the method comprises the following steps.

201: acquiring the angle offset.

The predetermined reference direction may be a direction of a reference position side in a display substrate, or a direction of an optical axis of an analyzing polarizer.

202: rotating the polarizer to be aligned with respect to a predetermined rotation axis according to the angle offset, so as to reduce or eliminate the angle offset.

For example, the predetermined rotation axis is a central point of the polarizer to be aligned.

It should be noted that, the details of the above-described steps may referred to the alignment apparatus as described above, which will be not repeated here.

Figure 11:
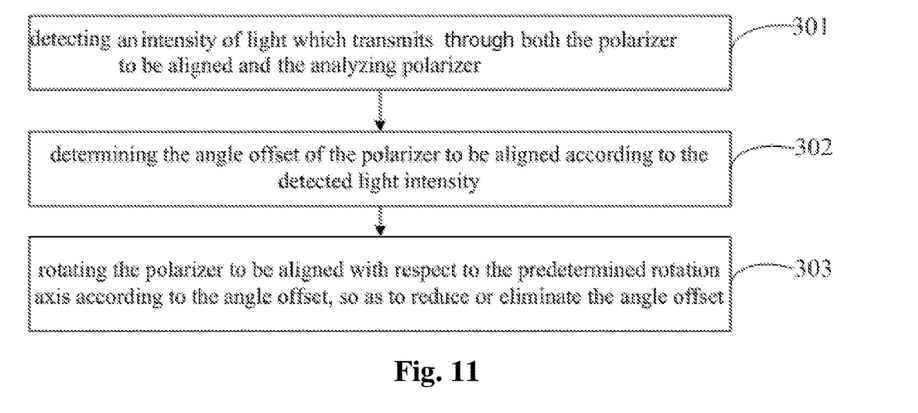
FIG. 11 is a flow schematic view illustrating yet another alignment method according to the embodiments of the disclosure.

Further, referring to FIG. 11, the method comprises the following steps.

301: detecting intensity of light which transmits both the polarizer to be aligned and the analyzing polarizer.

302: determining the angle offset of the polarizer to be aligned according to the detected light intensity.

For example, the step 302 comprises: determining the angle offset of the polarizer to be aligned according to a pre-stored look-up table between the light intensity and the angle offset.

For example, the step 302 comprises: determining an included angle between an optical axis direction of the analyzing polarizer and an optical axis direction of the polarizer to be aligned according to the detected light intensity; and determining the angle offset of the polarizer to be aligned according to a pre-stored look-up table between the included angle between the optical axis direction of the analyzing polarizer and the optical axis direction of the polarizer and the angle offset.

For example, the optical axis direction of the polarizer to be aligned is an absorption axis direction of the polarizer to be aligned, and the optical axis direction of the analyzing polarizer is an absorption axis direction of the analyzing polarizer; or, the optical axis direction of the polarizer to be aligned is a transmission axis direction of the polarizer to be aligned, and the optical axis direction of the analyzing polarizer is a transmission axis direction of the analyzing polarizer.

303: rotating the polarizer to be aligned with respect to the predetermined rotation axis according to the angle offset, so as to reduce or eliminate the angle offset.

For example, the predetermined rotation axis is a central point of the polarizer to be aligned.

It should be noted that, the details of the above-described steps may referred to the alignment apparatus as described above, which will be not repeated here.

Figure 12:
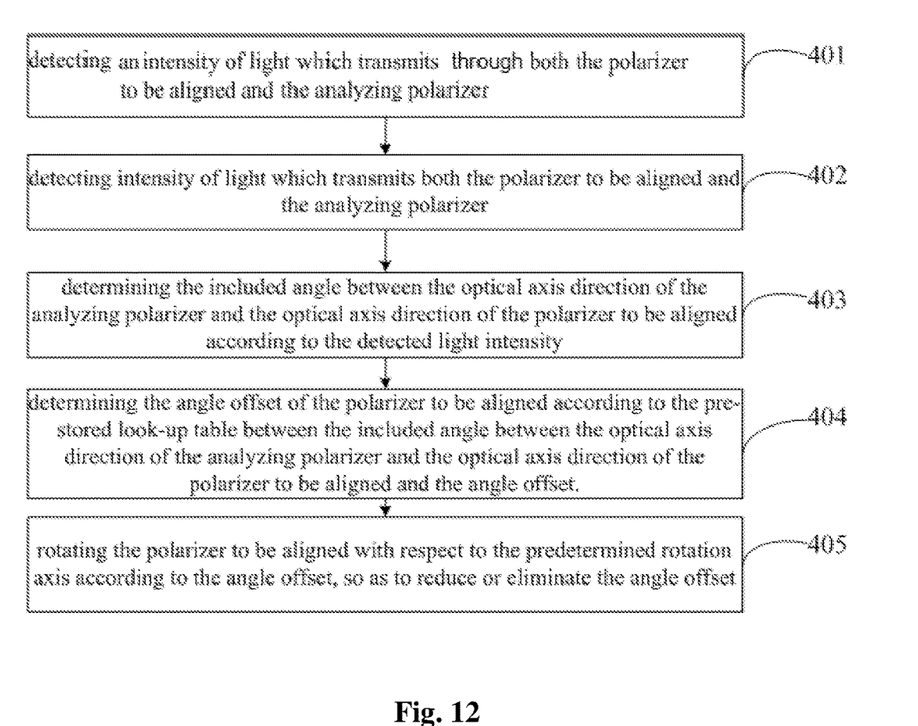
FIG. 12 is a flow schematic view illustrating still another alignment method according to the embodiments of the disclosure.

Further, referring to FIG. 12, the method comprises the following steps.

401: adjusting a position of the polarizer to be aligned in X and Y directions perpendicular to each other in the plane where the polarizer to be aligned is located.

For example, the step 401 comprises: by using an alignment mark on the polarizer to be aligned, adjusting the position of the polarizer to be aligned in X and Y directions perpendicular to each other in the plane where the polarizer to be aligned is located.

In order to adjust the position of the polarizer to be aligned, it is firstly judged whether coordinates of the position of the polarizer to be aligned corresponds to the coordinates of its expected position on the display substrate; if the coordinate information of the polarizer to be aligned corresponds to the coordinate information of its expected position on the display substrate, no adjustment is made to the position; if the coordinate information of the polarizer to be aligned does not correspond to the coordinate information of its expected position on the display substrate, the position of the polarizer should be adjusted, so that the coordinate information of the polarizer to be aligned correspond to the coordinate information of its expected position on display substrate, and the adjustment of the position of the polarizer to be aligned is realized.

402: detecting intensity of light which transmits both the polarizer to be aligned and the analyzing polarizer;

403: determining the included angle between the optical axis direction of the analyzing polarizer and the optical axis direction of the polarizer to be aligned according to the detected light intensity.

404: determining the angle offset of the polarizer to be aligned according to the pre-stored look-up table between the included angle between the optical axis direction of the analyzing polarizer and the optical axis direction of the polarizer to be aligned and the angle offset.

405: rotating the polarizer to be aligned with respect to the predetermined rotation axis according to the angle offset, so as to reduce or eliminate the angle offset.

For example, the predetermined rotation axis is the central point of the polarizer to be aligned.

It should be noted that, the details of the above-described steps may referred to the alignment apparatus as described above, which will be not repeated here. As described above, the step 401 is performed prior to the step 402. However, the step 401 may be performed after the step 405; in this case, the step of detecting intensity of light which transmits the polarizer to be aligned is performed at first, and then the follow-up steps are performed. In practice, a sequence of performing step 401 is determined according to actual requirements.

Figure 13:
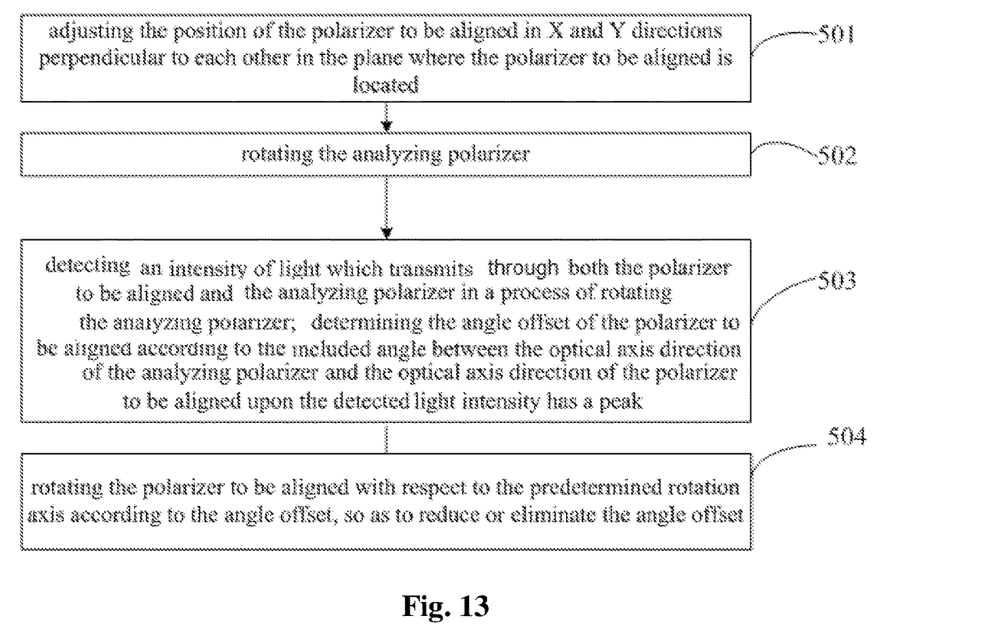
FIG. 13 is a flow schematic view illustrating a further alignment method according to the embodiments of the disclosure.

Further, referring to FIG. 13, the method comprises the following steps.

501: adjusting the position of the polarizer to be aligned in X and Y directions perpendicular to each other in the plane where the polarizer to be aligned is located.

For example, the step 501 comprises: by using the alignment mark on the polarizer to be aligned, adjusting the position of the polarizer to be aligned in X and Y directions perpendicular to each other in the plane where the polarizer to be aligned is located.

502: rotating the analyzing polarizer.

503: detecting intensity of light which transmits both the polarizer to be aligned and the analyzing polarizer in a process of rotating the analyzing polarizer; determining the angle offset of the polarizer to be aligned according to the included angle between the optical axis direction of the analyzing polarizer and the optical axis direction of the polarizer to be aligned upon the detected light intensity has a peak.

504: rotating the polarizer to be aligned with respect to the predetermined rotation axis according to the angle offset, so as to reduce or eliminate the angle offset.

For example, the predetermined rotation axis is the central point of the polarizer to be aligned.

It should be noted that, the details of the above-described steps may referred to the alignment apparatus as described above, which will be not repeated here. As described above, the step 501 is performed prior to the step 502. Of course, the step 501 may be performed after the step 504; in this case, a step of detecting intensity of light which transmits the polarizer to be aligned is performed at first, and then the follow-up steps are performed. In practice, a sequence of performing the step 501 is determined according to actual requirements.

In the alignment method according to the embodiments of the disclosure, in the alignment process of the polarizer, the position of the polarizer is finely adjusted according to the angle offset of the polarizer to be aligned in the plane where the polarizer to be aligned is located. Thus, no matter what shape the polarizer has, the alignment between an absorption axis or a transmission axis of the polarizer and a reference position side in a display device can be achieved according to the angle offset of the polarizer, which solves the problem of difficult alignment for non-rectangular polarizer in current alignment process, reduces difficulty in alignment of the non-rectangular polarizer, improves accuracy in alignment of the polarizer, and ensures display performance of the display device.

The foregoing embodiments merely are exemplary embodiments of the present disclosure, and not intended to define the scope of the present disclosure, and the scope of the disclosure is determined by the appended claims.

The present application claims priority of Chinese Patent Application No. 201410844035.3 filed on Dec. 30, 2014, the disclosure of which is incorporated herein by reference in its entirety as part of the present application.

The invention claimed is:

1. An alignment apparatus, configured to align a polarizer, wherein,
the alignment apparatus comprises
an analyzing polarizer, a light intensity detector, an angle offset determination circuit, and an angle compensation rotator,
the light intensity detector is configured to: detect intensity of light which transmits both a polarizer to be aligned and the analyzing polarizer, wherein the light directly enters into the analyzing polarizer after it passes through the polarizer to be aligned;
the angle offset determination circuit is configured to: determine an angle offset of the polarizer to be aligned according to the light intensity detected by the light intensity detector; and
the angle compensation rotator is configured to: rotate the polarizer to be aligned with respect to a predetermined rotation axis according to the angle offset, so as to reduce or eliminate the angle offset.

2. The alignment apparatus according to claim 1, wherein, the angle offset determination circuit determines the angle offset of the polarizer to be aligned according to a pre-stored look-up table between the light intensity and the angle offset.

3. The alignment apparatus according to claim 1, wherein, the offset determination circuit is configured to: determine an included angle between an optical axis direction of the analyzing polarizer and an optical axis direction of the polarizer to be aligned according to the light intensity detected by the light intensity detector, and determine the angle offset of the polarizer to be aligned according to a pre-stored look-up table between the included angle and the angle offset.

4. The alignment apparatus according to claim 3, wherein, the optical axis direction of the polarizer to be aligned is an absorption axis direction of the polarizer to be aligned, and the optical axis direction of the analyzing polarizer is an absorption axis direction of the analyzing polarizer; or,
the optical axis direction of the polarizer to be aligned is a transmission axis direction of the polarizer to be aligned, and the optical axis direction of the analyzing polarizer is a transmission axis direction of the analyzing polarizer.

5. The alignment apparatus according to claim 3, wherein, the alignment apparatus further includes a first rotator, and the first rotator is configured to: rotate the analyzing polarizer; and
the angle offset determination circuit is configured to: determine the angle offset of the polarizer to be aligned according to the included angle between the optical axis direction of the analyzing polarizer and the optical axis direction of the polarizer to be aligned in the case that the detected light intensity has a peak in a process of rotating the analyzing polarizer by the first rotator.

6. The alignment apparatus according to claim 1, wherein, the predetermined rotation axis is a central point of the polarizer to be aligned.

7. The alignment apparatus according to claim 1, wherein, the alignment apparatus further comprises a position adjustment driver; and
the position adjustment driver is configured to: drive the polarizer to be aligned to adjust a position of the polarizer to be aligned in X and Y directions perpendicular to each other within the plane where the polarizer to be aligned is located.

8. The alignment apparatus according to claim 7, wherein, the position adjustment driver is configured to: by using an alignment mark on the polarizer to be aligned, adjust the position of the polarizer to be aligned in X and Y directions perpendicular to each other within the plane where the polarizer to be aligned is located.

9. An alignment method for aligning a polarizer, comprising:
detecting intensity of light which transmits both a polarizer to be aligned and a analyzing polarizer, wherein the light directly enters into the analyzing polarizer after it passes through the polarizer to be aligned;

determining an angle offset of the polarizer to be aligned according to the detected light intensity; and rotating the polarizer to be aligned with respect to a predetermined rotation axis according to the angle offset, so as to reduce or eliminate the angle offset.

10. The alignment method according to claim 9, wherein, the determining the angle offset of the polarizer to be aligned according to the detected light intensity includes:

determining the angle offset of the polarizer to be aligned according to a pre-stored look-up table between the light intensity and the angle offset.

11. The alignment method according to claim 9, wherein, the determining the angle offset of the polarizer to be aligned according to the detected light intensity includes:

determining an included angle between an optical axis direction of the analyzing polarizer and an optical axis direction of the polarizer to be aligned according to the detected light intensity;

determining the angle offset of the polarizer to be aligned according to a pre-stored look-up table between the included angle between the optical axis direction of the analyzing polarizer and the optical axis direction of the polarizer to be aligned and the angle offset.

12. The alignment method according to claim 11, wherein, the optical axis direction of the polarizer to be aligned is an absorption axis direction of the polarizer to be aligned, and the optical axis direction of the analyzing polarizer is an absorption axis direction of the analyzing polarizer; or, the optical axis direction of the polarizer to be aligned is a transmission axis direction of the polarizer to be aligned, and the optical axis direction of the analyzing polarizer is a transmission axis direction of the analyzing polarizer.

13. The alignment method according to claim 11, wherein the method further comprises:

rotating the analyzing polarizer;

determining the angle offset of the polarizer to be aligned according to the included angle between the optical axis direction of the analyzing polarizer and the optical axis direction of the polarizer to be aligned in the case that the detected light intensity has a peak in a process of rotating the analyzing polarizer.

14. The alignment method according to claim 9, wherein, the predetermined rotation axis is a central point of the polarizer to be aligned.

15. The alignment method according to claim 9, wherein, the method further comprises:

adjusting a position of the polarizer to be aligned in X and Y directions perpendicular to each other within the plane where the polarizer to be aligned is located.

16. The alignment method according to claim 15, wherein the adjusting the position of the polarizer to be aligned in X and Y directions perpendicular to each other within the plane where the polarizer to be aligned is located includes:

by using an alignment mark on the polarizer to be aligned, adjusting the position of the polarizer to be aligned in X and Y directions perpendicular to each other within the plane where the polarizer to be aligned is located.

* * * * *